Oct. 15, 1968    N. D. SULLIVAN    3,405,534
METHOD FOR UNLOADING A TRUCK USING AN ICED SURFACE
Filed Feb. 14, 1966    2 Sheets-Sheet 1

*INVENTOR.*
NORMAN D. SULLIVAN

*INVENTOR.*
NORMAN D. SULLIVAN

United States Patent Office 3,405,534
Patented Oct. 15, 1968

3,405,534
METHOD FOR UNLOADING A TRUCK USING AN ICED SURFACE
Norman D. Sullivan, San Jose, Calif., assignor to Jack L. Bohan, San Jose, Calif.
Filed Feb. 14, 1966, Ser. No. 538,507
10 Claims. (Cl. 62—74)

ABSTRACT OF THE DISCLOSURE

A truck or other freight conveyance where a portion of the bed is provided with a layer of ice by a refrigeration system to facilitate the movement of freight. Another portion of the bed provides a region of slip-free traction.

---

The present invention relates to a novel truck bed and an improved method for loading and unloading freight.

At the present time moving cargo in and out of trucks is a time consuming and relatively inefficient operation. It is not uncommon to find truck loading by hand trucks or dollies, however, more advanced techniques employ conveyor systems or devices such as fork lifts to speed up the loading process, but the use of these systems invariably requires loading personnel over and above the truck driver. For example, while a fork lift driver takes from two to three hours to load the truck, the driver of the truck is not actively engaged.

By means of the present invention the loading and unloading activity is simplified and made less burdensome to the point where it is possible for the truck driver alone to move an entire load in and out of the trailer in less than an hour.

The improved system for transferring goods to and from freight vehicles is accomplished by providing, by artificial means, a thin layer of ice on the surface over which the goods are moved. The bed of the truck, for example, may be provided with subfloor refrigeration coils which create frost or ice on all or selected portions of the truck bed over which the goods may be moved.

It is an object, therefore, of the present invention to provide a system which will greatly lessen the time and effort required to transfer freight to and from a truck bed.

It is a further object to provide a novel truck bed which will allow the production of iced surfaces thereon at will.

Further objects and advantages of the present invention will become apparent from the following description of certain preferred embodiments thereof, selected for purposes of illustration and shown in the accompanying drawings in which.

Figure 1:
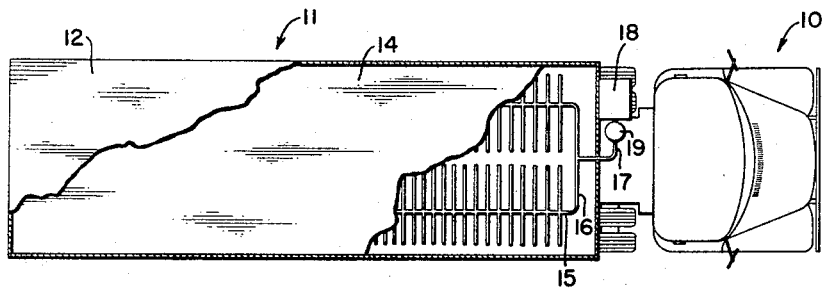
FIG. 1 is a plan view partly in section of a truck and trailer employing a refrigerated bed.

Referring now to FIG. 1, there is shown a tractor 10 hitched in a conventional manner to a trailer 11. The roof 12 of the trailer 11 is partly cut away to show the floor or bed 14 of the trailer. The floor 14 is shown with the uppermost surface partially removed so as to show the network of refrigeration coils 15 therebeneath. These coils or lines 15 are supplied with cooling medium from header 16 and feed line 17 from refrigeration unit 18. As is common practice today in the industry, the cooling unit 18 may be simply a tank of liquid nitrogen which provides cooling gas that is circulated through the coils 15. When control means 19 is activated to allow the refrigerator unit to circulate cooling media through the coils 15, the truck bed 14 becomes coated with ice by virtue of air moisture. The truck bed is preferably a metallic material which readily conducts heat so that heat can be quickly extracted therefrom to permit moisture in the air to condense and freeze on the surface. For example the surface of bed 14 may be a reinforced sheet of aluminum of appropriate thickness which is in intimate contact with the coils 15.

Figure 3:
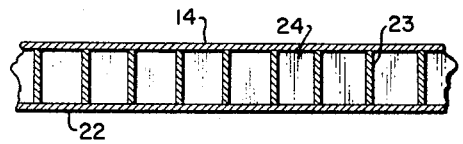
FIG. 3 is a cross sectional view of a preferred embodiment of a truck bed.
Figure 4:
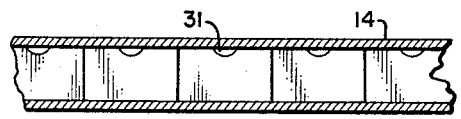
FIG. 4 is a cross sectional view of a further embodiment of the present invention as it pertains to the design of the truck bed.

Alternatively, as shown in FIG. 3 the truck bed surface 14 may be part of a laminated body comprised of upper and lower sheets 14 and 22 with vertical cross supports 23 to improve the rigidity and act as channels for the cooling medium from the refrigeration unit. Consequently, when refrigeration fluids pass through channel 24, frost forms on surface 14 whereby cargo can be readily transported across the surface. A wide variety of suitable configurations for the sliding surface 14 can be employed so as to produce integral bearing surface and cooling channels. For example, FIG. 4 shows surface 14 comprised of extruded sections which contain conduits 31 for passage of cooling fluid.

Once the truck bed surface 14 has been appropriately cooled so as to create a frost or thin ice film on the surface, the cargo can simply be pushed into place within the trailer as it will readily slide across the slippery iced surface.

Figure 2:
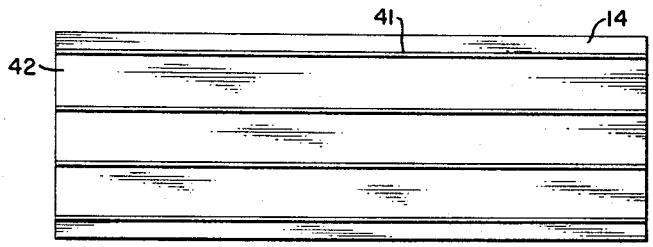
FIG. 2 is a plan view of an alternative refrigerated trailer bed or other freight-supporting surface.
Figure 5:
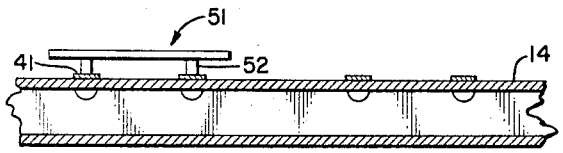
FIG. 5 is a cross sectional view of a truck bed with selected refrigerated areas and a pallet which rides upon the iced surfaces.
Figure 8:
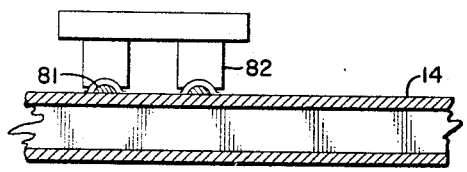
FIG. 8 is a cross sectional view of a truck bed having frozen rails and a pallet with skids mating with the rails.

In the situation where the cargo is extremely heavy, the driver may find it difficult to get footing on the iced surface. Accordingly, one satisfactory solution to this is shown in FIG. 2 wherein only select portions 41 of the truck bed are provided with a subsurface cooling means so as to produce runways 41 which are frosted and open areas 42 which are free of ice to permit firm footing. A further refinement along this line is to provide, as shown in FIG. 5, pallets 51 which have skids 52 that match the iced runways 41. These provide added flexibility since a fork truck can drop the pallet and load at the door-end of the trailer with skids 52 lined up on runway 41 and the driver can push the load into position to the rear of the trailer. To give a rail like configuration the bed may be provided with protuberance 81 as in FIG. 8 and the pallet skids 82 are provided with mating contours.

Figure 6:
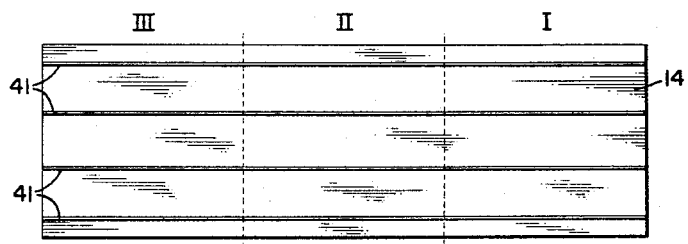
FIG. 6 is a plan view of a truck bed with iced runways and entire zones can be substantially frozen.

The bed can be provided with combinations of the above system where, for example, as shown in FIG. 6, the surface 14 may be first selectively frozen to produce runways 41 and then surface 14 frozen completely from side to side in zones I, II, and III. Zone I being that area which is closest to the cab and first to be filled. In this way, the goods can be pushed laterally for final positioning and tight loading.

Figure 7:
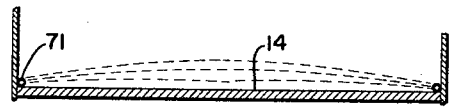
FIG. 7 is a cross sectional view of a truck bed employing spraying devices for providing auxiliary water.

In those climates where the relative humidity is so low that sufficient water cannot be extracted from the air, an auxiliary water source may be provided. As shown in FIG. 7, water pipes 71 with perforations thereon may be located along the side edge of the truck bed and by connecting to a tank source or external water source, the truck bed can be sprayed with a mist of water during the refrigeration so as to provide a thin film of ice. Once the shipment has been loaded onto truck bed 14, it is preferable to maintain refrigeration so as to avoid freezing the cartons or pallets etc. to the truck bed. However the refrigeration can be stopped during transit and then started again at the destination. Releasing the cartons etc. from the frozen surface can simply be done by jolting the load by an application of brakes. Wax or plastic coated cartons are preferred where pallets are not employed.

From the above description of preferred embodiments, it will be apparent to those skilled in the art that a variety of modifications and variations are possible and that the basic concept is adaptable to a wide variety of uses. For example, the loading platform at the truck dock may be provided with similar refrigeration surfaces to further facilitate loading and unloading. In addition the concept applies to open trailer, railroad cars, air freight cargo holds, ship holds etc. as well.

Having disclosed my invention, I claim:

1. A method for moving freight within a freight vehicle having a freight supporting surface in predetermined areas comprising reducing the temperature of the freight supporting surface in predetermined areas thereof below the dew point of the surrounding air, maintaining the temperature until a film of ice is produced on said surface, placing the freight on the ice, and moving the freight over the film of ice to the desired position on the freight supporting surface with the surface areas outside said predetermined areas providing traction surfaces.

2. A method as in claim 1 wherein the freight supporting surface is the bed of a truck.

3. A method as in claim 1 wherein the freight supporting surface is the bed of a truck and the freight is loaded from a dock of substantially the same height as said bed, said dock likewise being provided with a freight supporting surface which has predetermined areas thereof cooled below the dew point of the surrounding air to further facilitate loading and unloading said truck.

4. A freight vehicle having a freight supporting bed said bed containing means for cooling the entire freight supporting bed except for certain predetermined areas the means for cooling being capable of reducing the freight supporting bed surface to below 32° F. whereby water freezes on said freight supporting bed except in the predetermined areas which areas provide for regions of slip-free traction.

5. A freight vehicle as in claim 4 wherein said predetermined area is a path wide enough for walking purposes.

6. A freight vehicle as in claim 4 wherein the means for cooling is comprised of cooling conduits in heat transfer relationship with the freight supporting bed except for the predetermined areas and a cooling medium circulated through said conduits.

7. A freight vehicle as in claim 6 wherein the predetermined area is wide enough for walking purposes.

8. A freight vehicle as in claim 7 wherein the area of the freight supporting bed being cooled defined parallel iced runways on each side of the area wide enough for walking purposes and providing a pallet having skids so positioned as to run along said parallel iced runways.

9. A freight vehicle as in claim 8 wherein the parallel iced runways protrude above the bed surface and mate with the surface of the pallet skids.

10. A freight vehicle as in claim 7 wherein an auxiliary water source is provided and means are provided for spraying water therefrom upon said bed.

References Cited

UNITED STATES PATENTS

| 2,793,963 | 5/1957 | Tym | 62—66 X |
| 2,978,883 | 4/1961 | Jessee | 62—354 X |
| 3,255,597 | 6/1966 | Carter | 62—64 |
| 3,159,982 | 12/1964 | Schachner | 62—175 |

ROBERT A. O'LEARY, Primary Examiner.

W. E. WAYNER, Assistant Examiner.